Figure 1:
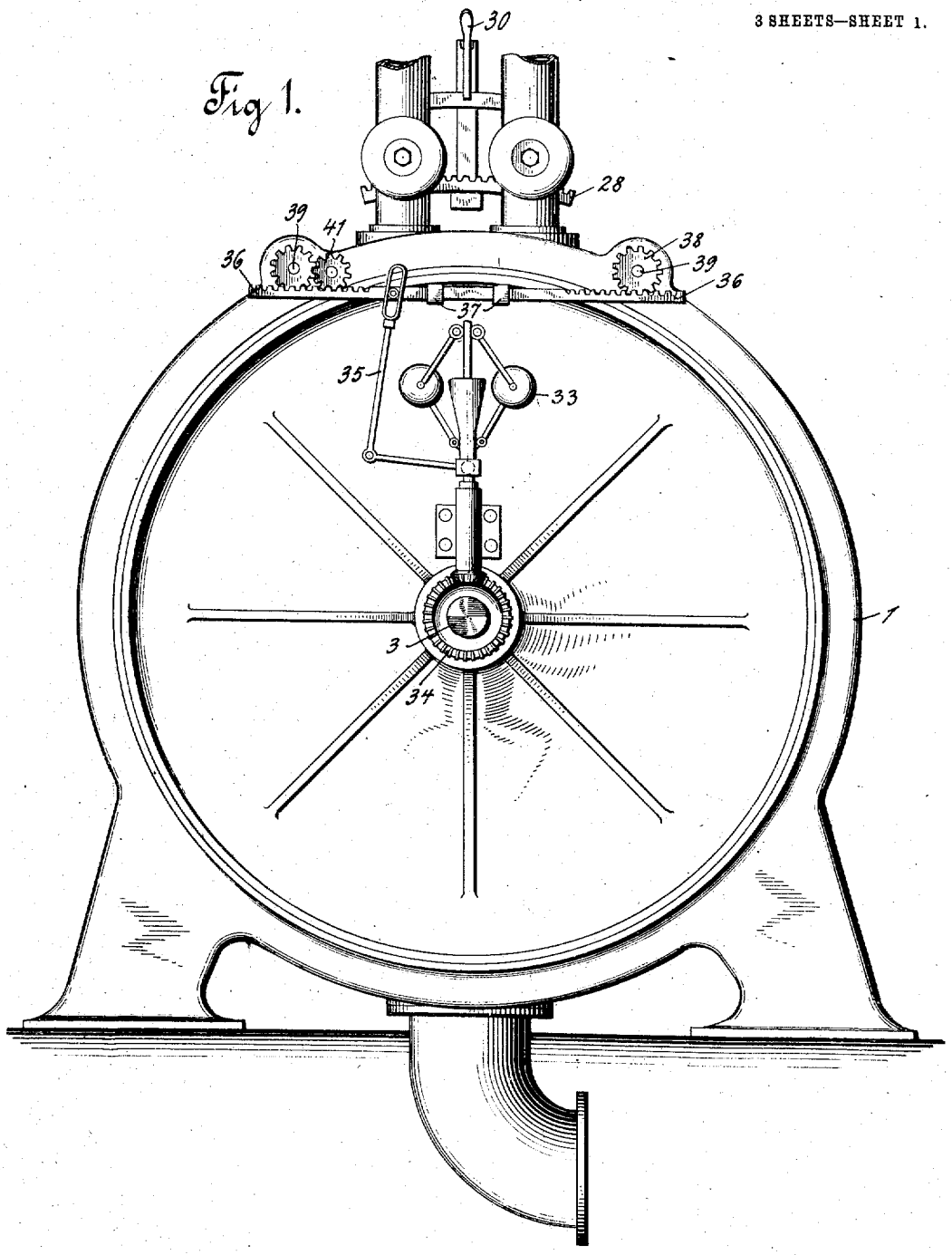

No. 12,319. REISSUED FEB. 21, 1905.

E. HUBER.

IMPACT MOTOR.

APPLICATION FILED JAN. 7, 1905.

3 SHEETS—SHEET 1.

Witnesses
John O. Gempler.
Geo. M. Harris.

Inventor
Ernst Huber.
By his Attorneys
Kenyon & Kenyon

No. 12,319. REISSUED FEB. 21, 1905.

E. HUBER.

IMPACT MOTOR.

APPLICATION FILED JAN. 7, 1905.

3 SHEETS—SHEET 2.

Witnesses
John O. Gempler.
Geo. M. Harris.

Inventor
Ernst Huber
By his Attorneys
Kenyon & Kenyon

No. 12,319. REISSUED FEB. 21, 1905.

E. HUBER.

IMPACT MOTOR.

APPLICATION FILED JAN. 7, 1905.

3 SHEETS—SHEET 3.

Witnesses
John O. Gempler.
Geo. M. Harris.

Inventor
Ernst Huber
By his Attorneys
Kenyon & Kenyon

No. 12,319. Reissued February 21, 1905.

UNITED STATES PATENT OFFICE.

ERNST HUBER, OF BROOKLYN, NEW YORK, ASSIGNOR OF FOUR-FIFTHS TO MYRON C. WICK, OF YOUNGSTOWN, OHIO, AND S. V. HUBER, OF PITTSBURG, PENNSYLVANIA.

IMPACT-MOTOR.

SPECIFICATION forming part of Reissued Letters Patent No. 12,319, dated February 21, 1905.

Original No. 770,291, dated September 20, 1904. Application for reissue filed January 7, 1905. Serial No. 240,186.

*To all whom it may concern:*

Be it known that I, ERNST HUBER, a citizen of the United States, and a resident of Brooklyn, in the county of Kings and State of New York, have invented certain new and useful Improvements in Impact-Motors, of which the following is a specification.

My invention relates to impact turbine-motors, and while in principle it is equally adapted for the utilization of both liquid and gaseous fluids it is especially valuable when used in connection with steam or other gaseous fluids the initial velocity of a jet of which is very high.

As motors of the type referred to have been heretofore constructed it has been necessary in order to utilize a material portion of the available energy in a jet of steam to either run the motor at an enormously high velocity, as twenty-five thousand or thirty thousand revolutions per minute, or to so combine a series of motors or motor-wheels that each will utilize a portion of the velocity of the steam. Motors built on either of these principles are necessarily difficult and expensive in construction, and practical efficiency can only be secured in motors which develop great power.

My invention has for an object to provide a turbine-motor by which substantially all of the available energy in a jet or jets of a fluid may be utilized without the necessity of operating the motor at an excessively high speed and without the necessity of compounding a series of motors in order to make the same practically efficient.

Other objects of my invention are to provide a motor which may be constructed to efficiently develop small powers as well as great ones, also one which is compact and simple and cheap and which may be constructed to run in either direction with equal efficiency and without an undesirable and expensive duplication of parts.

These and other objects of my invention will more fully appear from the following description.

My invention consists in the novel parts, improvements, and combinations herein shown and described.

The accompanying drawings, which are referred to herein and form a part hereof, illustrate one embodiment of my invention and serve, in connection with the description herein, to explain the principles thereof and the best mode in which I have contemplated applying those principles.

Figure 2:
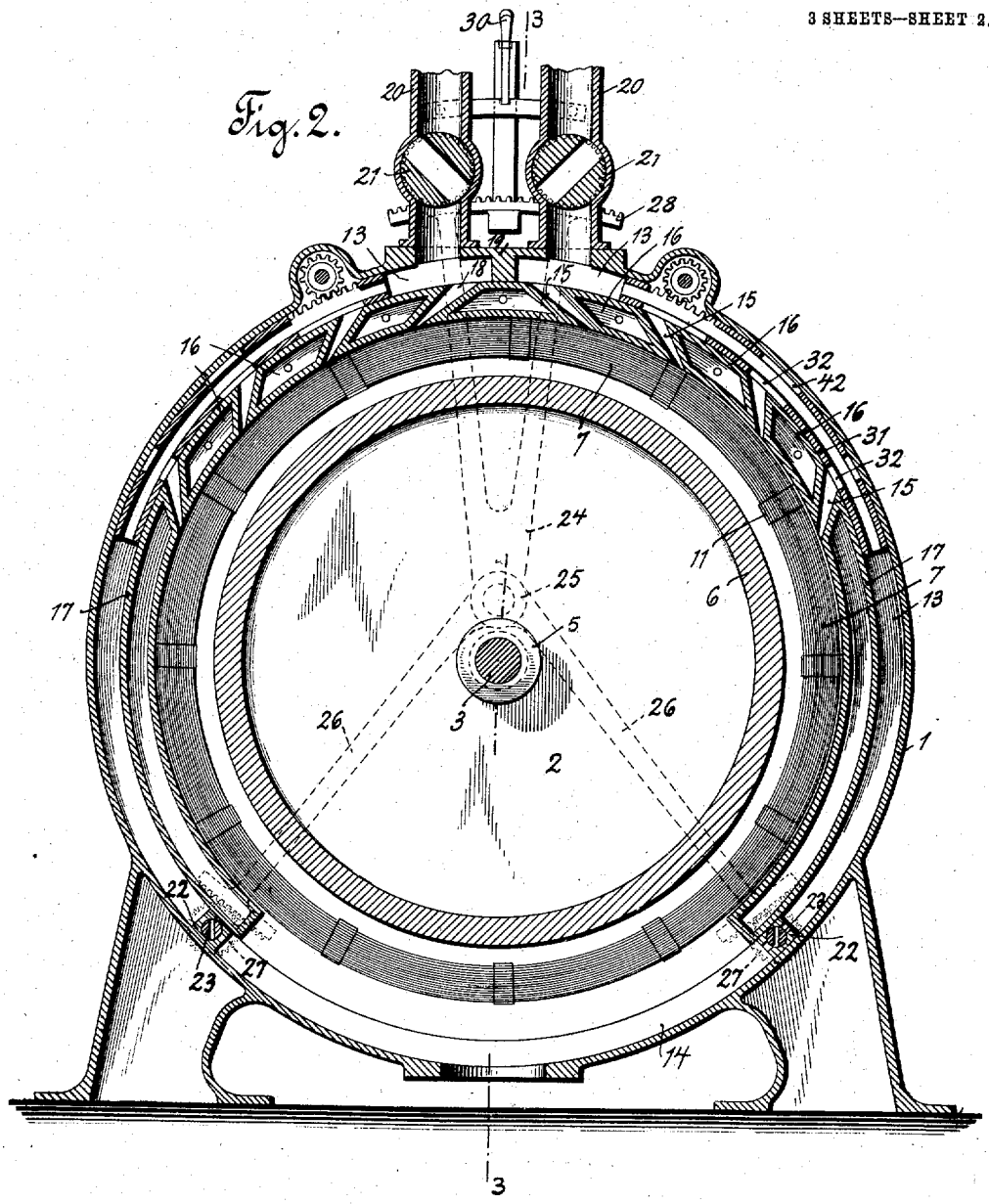
Figure 3:
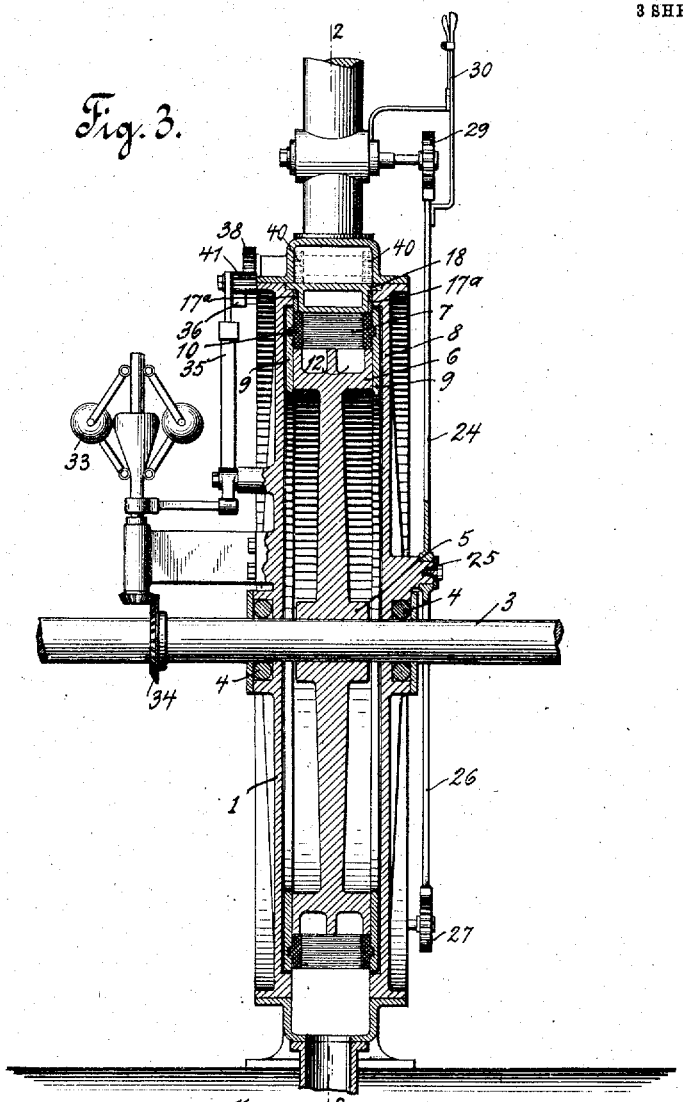
Figure 4:
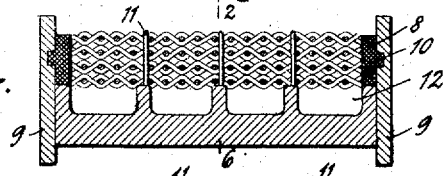
Figure 5:
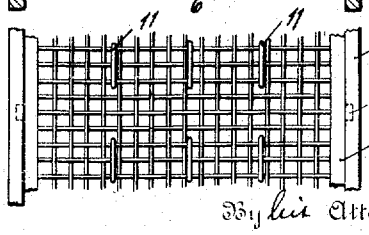

In the drawings, Figure 1 is a side elevation of a motor constructed in accordance with my invention. Fig. 2 is a longitudinal section of the same, taken on the line 2 2, Fig. 3. Fig. 3 is a transverse section of the same, taken on the line 3 3, Fig. 2. Fig. 4 is an enlarged sectional view more clearly illustrating certain details of the construction, and Fig. 5 is a plan view of a portion of the device shown in Fig. 4.

My invention is based upon the practically demonstrated principle that an infinite number of successive infinitely small impacts produced by a jet of a gaseous substance at high velocity will under proper conditions represent in the aggregate substantially all of the available energy contained in the jet.

In carrying my invention into effect a wheel is provided having a multiplicity of minute impact-surfaces so combined as to form an annular mass, and means are provided for directing one or more jets of fluid into said mass of impact-surfaces at an oblique angle thereto, said annular mass having a number of impact-surfaces in the direction of the jet or jets.

Referring now to the drawings in detail, 1 represents a suitable casing. 2 represents a wheel, and 3 represents a shaft upon which the wheel is mounted, said shaft being journaled, preferably, by the ball-bearings 4 in the casing 1. In accordance with the embodiment of my invention shown the wheel 2 comprises an inner portion, which preferably consists of a single casting having a hub portion 5 and a rim portion 6, upon which the annular mass of impact-surfaces 7, forming the outer portion, is mounted. This mass of impact-surfaces 7 may be formed in any suitable way. Care should be taken, however, to give the mass of impact-surfaces as great permeability as is consistent with a suitable number of elements and the required strength and rigidity of the structure, the nature of the fluid to be used and the initial velocity of a jet thereof being taken into consideration. I have found in practice that a mass of impact-surfaces having a suitable number of elements and a suitable degree of permeability may be formed by placing upon the periphery of the wheel a number of layers of a suitable reticulated material. The permeability of the mass is augmented by making the elements forming the impact-surfaces as compared with the spaces between them as small as is consistent with the strength required. It is to be observed that the number of impact-surfaces in a unit of space varies directly with the distance between the successive surfaces in either or both the circumferential or radial directions. With steam the best results have been produced by winding upon the periphery fifteen or twenty, more or less, convolutions of wire screen having a small gage of wire and a mesh of about twelve to the inch. Where wire screen is used, that having the meshes firmly secured together, as by being galvanized after it is woven, is preferable in order to prevent the elements of the mass from becoming oxidized and at the same time to more firmly secure the elements in position.

Provision should be made to prevent any deviation in the flow of fluid from a circumferential direction in the mass of impact-surfaces. This may be accomplished in any suitable way. In accordance with the construction shown the opposite sides of the ring 7 are closed to the lateral passage of fluid by dipping each of them to a suitable depth—as, say, one-eighth of an inch—in a bath of suitable soft metal, as indicated at 8 in the drawings. This construction further secures the elements of the mass together and prevents the same from being expanded and loosened upon the wheel under the influence of the centrifugal force. The mass or ring 7 may be further secured to the wheel as a whole by means of the flange-rings 9, which are secured to the opposite sides of the rim 6 and are provided near their outer edges with suitable recesses in which fit projections 10 formed upon the opposite sides of the ring 7, preferably by being formed integrally with the soft metal 8. Where desired, the intermediate portions of the convolutions forming the ring 7 may be secured together at suitable intervals, as by the wire binding 11, (clearly shown in Figs. 2, 4, and 5,) said binding 11 preferably being arranged in planes at right angles to the axis of the wheel in order to avoid as much as possible the clogging of the active portion of the ring 7. To facilitate the penetration of the fluid to the innermost layer or layers of the ring 7, the periphery 6 of the wheel may be provided with one or more annular grooves 12, which form escape-passages for such of the fluid as may pass through the ring.

The fluid may be directed into the ring 7 by one or more jets, which should have such an angle with relation to the ring as to cause the fluid in the jet to enter the ring and yield the maximum effect. These jets may be formed in any suitable manner.

In accordance with the construction shown a fluid-supply chamber 13 is formed for a portion of the distance around the circumference of the wheel, and an exhaust-chamber 14 is formed around a succeeding portion of the circumference of the wheel. A partition is formed between the fluid-supply chamber and the wheel, in which partition a series of jet-forming passages 15 are provided. The passages 15 are preferably tapered, so as to make them successively smaller in cross-section as they approach the wheel, and, as shown, they are formed on lines which are substantially tangential to the inner surface of the ring 7. For convenience of construction the partition between the fluid-supply chamber and the wheel is formed of a series of members 16, removably secured to the casing and between the opposing ends of which the passages 15 are formed. The size and number of the jets 15 may be varied between wide limits; but care should be taken not to place them so closely together that the steam discharged from one passage will interfere with that discharged from another passage, and the combined area of the passages should not be so great, taking into consideration the nature of the fluid being used and the variations in the velocity and the volume of the stream thereof produced by the mass of impact-surfaces, as to create an objectionable back pressure between the jets and the exhaust. In order to prevent the escape of the fluid around the circumference of the wheel, the inner surface of the partition should be brought as close as possible to the surface of the ring 7, and in order to give the fluid sufficient time to expend its velocity upon the impact-surfaces before it reaches the exhaust-chamber the last one of the jets 15 should be located at some distance from the beginning of the exhaust-chamber. To this end the last section 17 of the partition is made considerably longer than the other sections. Rings 17ª may be arranged between the partition and the flange-rings 9 to prevent leakage.

With the mass of impact-surfaces constructed in the manner described it will be noted that there will be an equal number of impact-surfaces facing in opposite directions. In order, therefore, to drive the wheel in opposite directions, it is only necessary to provide an additional set of jet-forming passages pointing in the opposite direction with relation to the circumference of the wheel from that in which the first set of jet-forming passages point. This may be conveniently done by providing a second fluid-supply chamber 13 and a second set of partition members 16 17 on the opposite side of the wheel from those before described. In this case the partition member 18, which is located between the fluid-supply chambers 13, has its opposite ends beveled in opposite directions, as shown, and its upper surface is arranged in contact with the wall 19, which separates the chamber 13. The fluid is supplied to the chambers 13 by supply-pipes 20, in which suitable controlling-valves 21 are located. When the motor is being driven in one direction, the fluid-supply chamber 13 which is not in use may, if desired, be made to form a part of the exhaust-chamber, the fluid carried by the mass of impact-surfaces being in this way given more time to free itself. To this end a passage 22 is provided between each of the fluid-supply chambers 13 and the exhaust-chambers 14, said passages being controlled by suitable valves 23. In order to facilitate the operation of reversing the motor, the valves 21 and 23 may be suitably connected to operate in unison. In accordance with the construction shown these valves are connected to a common operating mechanism, which consists of a segment-frame 24, which is pivoted at a central point to a stud 25 and is provided with a pair of segment-arms 26, each of which meshes with gears 27, carried by the valves 23, and with a segment 28, which meshes with gears 29, carried by the valves 21. The segment-frame may be provided with a suitable operating-handle, as 30.

For the purpose of regulating the power of the motor any suitable means may be provided. Preferably, however, the power is regulated by cutting off one or more of the jet-forming passages 15, as in this way the quantity of the fluid discharged into the mass of impact-surfaces is varied without diminishing its velocity. In accordance with the construction shown a slide valve or gate 31 is arranged in each of the fluid-supply chambers 13. As shown, each of the valves 31 is provided with a series of openings 32, which are adapted to establish communication between the supply-chamber and a corresponding series of the passages 15. As shown, the openings are successively longer from one end of the valve toward the other end, so that as the valve is moved in one direction or the other one or more of the corresponding passages 15 are opened or closed.

In order that the speed of the motor may be maintained substantially uniform notwithstanding the variations in the load upon the motor, the valves 32 may be automatically shifted by any suitable means adapted to be rendered operative by variations in the speed of the motor. In accordance with the construction shown an ordinary form of centrifugal governor 33 is provided, the same being driven from the main shaft 3 of the motor by any suitable means, as the bevel-gears 34. The governor 33 is connected to one arm of the angle-lever 35, the opposite arm of which is connected to a bar 36, mounted to slide horizontally in suitable bearings 37 near the top of the casing. The bar 36 is provided at each end with a rack, each of which is adapted to drive a pinion 38, said pinions being mounted on the short transverse shafts 39, which extend through the casing 2 and are provided at opposite sides of the fluid-supply chambers 13 with the pinions 40, which engage suitable racks formed on the opposite sides of the valves 32. In order that the valves on both sides of the machine may be caused to move in the same direction with relation to the respective jet-forming passages which they control, an intermediate pinion 41 is preferably provided between one of the gears 38 and the corresponding rack on the bar 36. For the purpose of enabling the valves 32 to be easily moved in the supply-chambers as required to render the operation of the governing devices sensitive said valves are made hollow and are accurately fitted to the opposite walls of the fluid-supply chambers, and openings 42, corresponding to the openings 32, are provided in the outer walls of the valves. In this way the pressure of the fluid on the valves in opposite directions is perfectly balanced, thus leaving the valve free to be easily moved in either direction.

The operation of the motor having been fully described in connection with the description of the construction thereof, further description of the operation is unnecessary.

My invention in its broader aspects is not limited to the precise construction shown nor to the precise construction by which it may be carried into effect, as many changes may be made in such construction without departing from the main principles of my invention and without sacrificing its chief advantages.

Having thus described my invention, what I claim as new, and desire to secure by Letters Patent, is—

1. An impact-motor comprising a wheel having a multiplicity of minute impact-surfaces so combined as to form an annular mass, and means arranged to direct one or more jets of fluid into said mass of impact-surfaces at an oblique angle thereto, said annular mass having a number of impact-surfaces in the direction of the jet or jets of fluid.

2. An impact-motor comprising a wheel having a multiplicity of minute impact-surfaces so combined as to form an annular mass, and means arranged to direct one or more jets of fluid into said mass of impact-surfaces at an oblique angle thereto, said annular mass being closed to the passage of fluid except in the direction of the revolution thereof, and having a number of impact-surfaces in the direction of the jet or jets of fluid.

3. An impact-motor comprising a wheel having on its periphery a multiplicity of minute impact-surfaces so combined as to form an annular mass, and means arranged to direct one or more jets of fluid into said mass of impact-surfaces on a line or lines which are substantially tangent to the inner surface of said annular mass, said annular mass being closed to the passage of fluid at its opposite sides and having a number of impact-surfaces in the direction of the jet or jets of fluid.

4. An impact-motor comprising a wheel having an annular groove or chamber at or near its periphery having a multiplicity of minute impact-surfaces so combined as to form an annular mass located adjacent to said annular chamber, and means arranged to direct one or more jets of fluid through said mass of impact-surfaces into said chamber, said annular mass having a number of impact-surfaces in the direction of the jet or jets of fluid.

5. An impact-motor comprising a wheel having at or near its periphery a number of layers of reticulated material forming an annular mass of minute impact-surfaces, and means arranged to direct one or more jets of fluid into said mass of impact-surfaces at an oblique angle thereto.

6. An impact-motor comprising a wheel having at or near its periphery a number of layers of reticulated material forming an annular mass of minute impact-surfaces, said layers being closed and secured together at their opposite sides, and means arranged to direct one or more jets of fluid into said mass at an oblique angle thereto.

7. An impact-motor comprising a wheel having at or near its periphery a number of layers of reticulated material forming an annular mass of minute impact-surfaces, said layers being secured together at their opposite edges and at suitable intermediate points, and means arranged to direct one or more jets of fluid into said mass of impact-surfaces at an oblique angle thereto.

8. An impact-motor comprising a wheel having wound upon its periphery a number of convolutions of wire screen, forming an annular mass of minute impact-surfaces, and means to direct one or more jets of fluid into said mass of impact-surfaces at an oblique angle thereto, substantially as described.

9. An impact-motor comprising a wheel having an annular groove or chamber formed in its periphery, a number of convolutions of wire screen wound upon said wheel over said annular chamber and forming an annular mass of minute impact-surfaces, and means arranged to direct one or more jets of fluid into said mass of impact-surfaces on a line or lines which are substantially tangent to the inner convolution of said wire screen substantially as described.

10. In an impact-motor, the combination with a wheel having a multiplicity of minute impact-surfaces so combined as to form an annular mass, of a casing having a fluid-supply chamber and an exhaust-chamber, each of which chambers being arranged in coöperative relation with a portion of the circumference of the wheel, one or more jet-forming passages arranged between the supply-chamber and a mass of impact-surfaces on the wheel, and an outlet-passage communicating with the exhaust-chamber, said annular mass having a number of impact-surfaces in the direction of the jet or jets of fluid.

11. In an impact-motor, the combination with a wheel having at or near its periphery, an annular mass of minute impact-surfaces, of a casing having a fluid-supply chamber and an exhaust-chamber, each of said chambers being arranged in operative relation to a portion of the circumference of the wheel, a wall or partition arranged between the supply-chamber and the wheel, and having a surface located in close proximity to the said mass of impact-surfaces, one or more jet-forming passages arranged in said wall or partition and an outlet communicating with the exhaust-chamber, said annular mass having a number of impact-surfaces arranged in the direction of the jet or jets of fluid.

12. In an impact-motor, the combination with a wheel having a multiplicity of impact-surfaces, of a casing having a supply-chamber arranged in operative relation with a portion of the circumference of the wheel, a wall or partition arranged between the supply-chamber and the wheel comprising two or more members removably secured to the casing, said members being so constructed and arranged with relation to each other as to form one or more jet-forming passages between their opposing surfaces.

13. In an impact-motor, the combination with a wheel having a multiplicity of impact-surfaces, of a casing having a groove circumferentially arranged with relation to said wheel and two or more members having flanges adapted to removably engage said groove, said members being so constructed and arranged with relation to each other as to form one or more jet-forming passages between their opposing surfaces.

14. In an impact-motor comprising a wheel having a multiplicity of minute oppositely-arranged impact-surfaces so combined as to form an annular mass, and means whereby one or more jets of fluid may be directed from opposite directions into said mass of impact-surfaces at an oblique angle thereto, said annular mass having a number of impact-surfaces in the direction of either jet or jets of fluid.

15. An impact-motor comprising a wheel having at or near its periphery a number of layers of reticulated material forming an annular mass of oppositely-arranged minute impact-surfaces, and means whereby one or more jets of fluid may be directed into said mass of impact-surfaces at an oblique angle to said mass from opposite directions.

16. An impact-motor comprising a wheel having at or near its periphery a number of layers of reticulated material forming an annular mass of oppositely-arranged minute impact-surfaces, said mass being closed to the passage of fluid at its opposite sides, and means whereby one or more jets of fluid may be directed into said mass of impact-surfaces at an oblique angle to said mass from opposite directions.

17. An impact-motor comprising a wheel having wound upon its periphery a number of convolutions of wire screen forming an annular mass of oppositely-arranged impact-surfaces, and means whereby one or more jets of fluid may be directed into said mass of impact-surfaces at an oblique angle to said mass from opposite directions.

18. In an impact-motor, the combination with a wheel having a multiplicity of minute oppositely-arranged impact-surfaces so combined as to form an annular mass, of a casing having two fluid-supply chambers and an exhaust-chamber, each of said chambers being arranged in operative relation with a portion of the circumference of the wheel, one or more jet-forming passages arranged between each of the supply-chambers and a mass of impact-surfaces, the passages communicating with one chamber pointing in one direction, and those communicating with the other chamber in the opposite direction, and an outlet-passage communicating with the exhaust-chamber, said annular mass having a number of impact-surfaces in the direction of either of the jet or jets of fluid.

19. In an impact-motor, the combination with a wheel having a multiplicity of oppositely-arranged impact-surfaces, of a casing having two supply-chambers and an exhaust-chamber, each of said chambers arranged in operative relation with a portion of the circumference of the wheel, one or more jet-forming passages arranged between each of the supply-chambers and the impact-surface of the wheel, the passages communicating with one chamber pointing in one direction and those communicating with the other chamber in the opposite direction, a passage between each of the supply-chambers and the exhaust-chamber, means for opening and close the said latter passages, and an outlet-passage communicating with the exhaust-chamber, substantially as described.

20. In an impact-motor, the combination with a wheel having a multiplicity of minute impact-surfaces so combined as to form an annular mass, of a casing having a plurality of jet-forming passages, and means rendered operative by variations in the speed of the wheel for closing one or more of said passages, said annular mass having a number of impact-surfaces in the direction of the jets.

21. In an impact-motor the combination of a wheel having a multiplicity of separated minute impact-surfaces, so disposed as to provide a plurality of them in both axial and radial directions, and means for directing a stream of fluid into said impact-surfaces in a tangential direction.

22. In an impact-motor, the combination with a wheel having a multiplicity of minute impact-surfaces so combined as to form an annular mass, of a plurality of jet-passages, and means rendered operative by variations in the speed of the wheel for closing said passages successively, said annular mass having a number of impact-surfaces in the direction of the jets.

23. In an impact-motor, a wheel having a multiplicity of minute impact-surfaces so disposed as to provide a plurality of them in both axial and radial directions.

24. In an impact-motor, the combination of a wheel having a multiplicity of minute impact-surfaces so separated as to permit the liquid to pass between said surfaces, and means for directing a stream of fluid through said impact-surfaces, substantially as described.

In testimony whereof I have signed my name to this specification in the presence of two subscribing witnesses.

ERNST HUBER.

Witnesses:
J. H. FREEMAN,
EDWIN SEGER.